Oct. 7, 1952  S. L. CHRISTIE  2,613,248
BATTERY TESTING APPARATUS AND METHOD
Filed March 22, 1948  3 Sheets-Sheet 1

INVENTOR:
SOREN L. CHRISTIE
BY HIS ATTORNEYS
HARRIS, KIECH, FOSTER & HARRIS

Oct. 7, 1952  S. L. CHRISTIE  2,613,248
BATTERY TESTING APPARATUS AND METHOD
Filed March 22, 1948  3 Sheets-Sheet 2

INVENTOR:
SOREN L. CHRISTIE
BY HIS ATTORNEYS
HARRIS, KIECH, FOSTER & HARRIS

Oct. 7, 1952 S. L. CHRISTIE 2,613,248
BATTERY TESTING APPARATUS AND METHOD
Filed March 22, 1948 3 Sheets-Sheet 3

INVENTOR:
SOREN L. CHRISTIE
BY HIS ATTORNEYS
HARRIS, KIECH, FOSTER & HARRIS

Patented Oct. 7, 1952

2,613,248

UNITED STATES PATENT OFFICE 2,613,248

BATTERY TESTING APPARATUS AND METHOD

Soren L. Christie, Los Angeles, Calif., assignor to McColpin-Christie Corp., a corporation of California Application March 22, 1948, Serial No. 16,258

22 Claims. (Cl. 175—183)

My invention relates in general to a method of and apparatus for comparing electric quantities of different magnitudes and since the fundamental principles of the invention are particularly applicable to a method of and apparatus for comparing the voltages of the individual cells of a multi-cell battery, such an application will be considered herein for convenience in disclosing the invention.

As is well known in the art, the condition of a storage battery may be determined by comparing the voltages of the individual cells, the comparison of the cell voltages usually being made with no load on the battery, while the battery is being charged, and/or while the battery is being discharged. If such a comparison of the voltages of the cells of an ordinary six-volt storage battery, for example, discloses that the difference between the maximum and minimum cell voltages is 0.10 volt or more, a serious defect in the battery is indicated. A difference of from 0.10 to 0.15 volt between the maximum and minimum cell voltages of such a battery may, for example, indicate a partially short-circuited cell, a broken cell, a crack in the battery case between adjacent cells, or a reduction in active plate surface. Other conditions may also produce an excessive difference between the maximum and minimum cell voltages, one of these, which will be discussed in more detail hereinafter, being large differences in the specific gravities of the electrolyte from one cell to another.

In order to obtain an accurate indication of the condition of a battery by the foregoing cell-voltage comparison method, it is essential that the difference between the maximum and minimum cell voltages be determined with considerable accuracy, lack of accuracy being the principal disadvantage of the method as heretofore practiced. Accordingly, a primary object of my invention is to provide a method of and apparatus for determining the difference between the maximum and minimum cell voltages of a battery extremely accurately.

As heretofore practiced, the cell-voltage comparison method of determining the condition of a battery involves measuring the voltage of each individual cell and then determining the difference between the maximum and minimum cell voltages by subtraction, the individual cell voltages conventionally being measured simultaneously with a plurality of voltmeters, i. e., one for each cell, or being measured successively with a single voltmeter. Using a separate voltmeter for each cell may produce large errors because of the fact that the usual commercial voltmeter has an error tolerance of ±2% of its full scale deflection. Thus, as an example, if three voltmeters, each having a full scale deflection of three volts, are used to measure the individual cell voltages of a six-volt three-cell battery, it will be apparent that the error in the difference between the maximum and minimum cell voltages may be as much as ±0.12 volt. Even if voltmeters of the laboratory type, instead of the commercial type, are used, the error in the difference between the maximum and minimum cell voltages may be as much as ±0.06 volt since laboratory type voltmeters ordinarily have an error tolerance of ±1% of full scale deflection. In view of the fact that a difference of from 0.10 to 0.15 volt between the maximum and minimum cell voltages is indicative of a serious defect in a battery of the type under consideration, it will be apparent that a possible error of ±0.12 volt, or even a possible error of ±0.06 volt with a laboratory-type voltmeter, cannot be tolerated.

Even if a single voltmeter is used to measure the individual cell voltages in sequence, it is difficult to obtain the difference between the maximum and minimum cell voltages with sufficient accuracy due to the fact that errors may be introduced in making and recording the successive readings, in computing the maximum difference, or in connecting the meter to successive cells, irrespective of whether this is done manually or through the use of a system of switches. Also, any value obtained for the difference between the maximum and minimum cell voltages when the battery is being discharged is unreliable if the individual cell voltages are measured in sequence with a single meter due to the fact that the cell voltages may change between the time that the voltages of the first and last cells are measured. Since, as hereinabove discussed, a relatively small difference between the maximum and minimum cell voltages indicates a serious defect, it will be apparent that changes in the cell voltages of only a few hundredths of one volt while the cell voltage measurements are being made would produce serious errors in the value obtained for the difference between the maximum and minimum cell voltages.

In view of the foregoing considerations, an important object of the present invention is to provide a method of and apparatus for determining directly with a single indicator and in a single operation the difference between the maximum and minimum cell voltages. Thus, as an example, by employing for the indicator a voltmeter for reading only the maximum voltage difference and having a full scale deflection of 0.5 volt while having the usual error tolerance of ±2% for voltmeters of the commerical type, it will be apparent that the difference between the maximum and minimum cell voltages may be determined within ±0.01 volt. Even greater accuracy may, of course, be obtained by using a voltmeter having a smaller error tolerance, or by using one which has been calibrated to determine its error.

Another object of the present invention is to provide a method of and apparatus for determining the difference between the maximum and minimum cell voltages of a battery which involve establishing an electric quantity proportional to the difference between the maximum and minimum cell voltages and subsequently measuring this electric quantity in voltage units.

A further object is to provide a method and apparatus of the character described which involve varying the impedance of an electric circuit in accordance with variations in the difference between the maximum and minimum cell voltages of the battery being tested, and which involve measuring the effect of such an impedance variation in terms of the difference between the maximum and minimum cell voltages.

Still another object is to provide an apparatus which includes a plurality of saturable reactors having their controlling windings connected to the cells of the battery to be tested and having their controlled windings connected to an indicator in such a manner that the indicator is responsive to any difference between the maximum and minimum cell voltages.

Another important object of the present invention is to provide a method of compensating for variations in the specific gravity of the electrolyte from one cell to another.

An additional object is to provide apparatus of the character described which may be used as part of a control system which is responsive to the condition of a battery connected therein.

Still another object is to provide a method of and apparatus for accurately evaluating the condition of a battery without any necessity for any special skill on the part of the operator.

The foregoing objects and advantages of my invention, together with various others which will be evident hereinafter, may be attained through the utilization of the exemplary embodiments of the invention which are described in detail hereinafter in connection with the accompanying drawings. Referring to the drawings, which are for illustrative purposes only.

Figure 1:
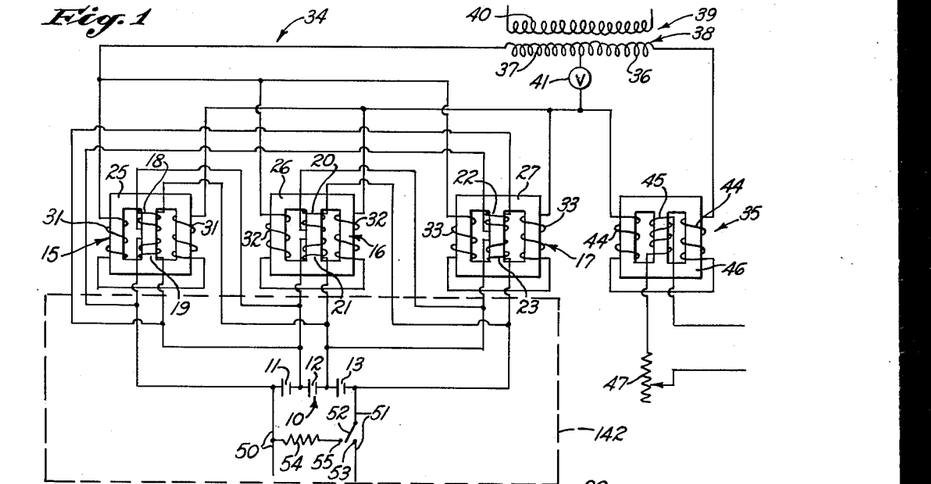
Fig. 1 is a diagrammatic view illustrating one embodiment of an apparatus of the invention which is capable of performing the method of the present invention.

Referring particularly to Fig. 1 of the drawings, I show an apparatus for determining the difference between the maximum and minimum cell voltages of a battery 10 which is exemplified as a three-cell battery for purposes of illustration, the three cells being identified by the numerals 11, 12 and 13, respectively. The battery 10 may, for example, be of the type ordinarily used in automobiles.

The apparatus for testing the battery 10 includes three saturable reactors 15, 16 and 17, there being one such reactor for each of the cells 11, 12 and 13 of the battery. Each of the saturable reactors 15, 16 and 17 includes two controlling windings which are connected across two of the cells of the battery 10, the controlling windings of the reactor 15 being identified by the numerals 18 and 19, respectively, those of the reactor 16 being identified by the numerals 20 and 21, respectively, and those of the reactor 17 being identified by the numerals 22 and 23, respectively. The controlling winding 18 of the saturable reactor 15 is connected across the cell 12 of the battery and the controlling winding 19 thereof is connected across the cell 11. Similarly, the controlling windings 20 and 21 of the saturable reactor 16 are connected across the cells 13 and 12, respectively, of the battery 10, and the controlling windings 22 and 23 of the saturable reactor 17 are connected across the cells 11 and 13, respectively, of the battery.

The controlling windings of each of the saturable reactors 15, 16 and 17 are wound in opposite directions with respect to each other and, in the particular construction illustrated, are wound on the center leg of a three-legged core, the cores of the reactors 15, 16 and 17 being identified by the numerals 25, 26 and 27, respectively. Each of the saturable reactors 15, 16 and 17 also includes two controlled windings which are connected in series and which are wound in opposite directions with respect to each other on the two outer legs of the corresponding core. The controlled windings of the saturable reactor 15 are identified by the numerals 31 and are wound in opposite directions about the outer legs of the core 25, the controlled windings of the reactor 16 are identified by the numerals 32 and are wound in opposite directions about the outer legs of the core 26, and the controlled windings of the reactor 17 are identified by the numerals 33 and are wound in opposite directions about the outer legs of the core 27. The controlled windings 31 are connected in series, as are the controlled windings 32 and the controlled windings 33.

The pairs of controlled windings 31, 32 and 33 are connected in parallel in one arm of a bridge circuit which is indicated generally by the numeral 34, an impedance 35, which is preferably a saturable reactor as will be discussed in more detail hereinafter, forming the second arm of this circuit. The third and fourth arms of the bridge circuit 34 are formed by portions 36 and 37 of a secondary winding 38 of a transformer 39, the transformer having a primary winding 40 which is connected to an alternating current source. A suitable indicator, exemplified as a voltmeter 41, is connected across one diagonal of the bridge circuit 34, one terminal of the voltmeter being connected to the junction between the first and second arms of the bridge and the other terminal thereof being connected to the junction of the third and fourth arms of the bridge.

Considering the operation of the testing apparatus illustrated in Fig. 1 of the drawings, it will be apparent that since the controlling windings 18 and 19 of the saturable reactor 15 are connected across the cells 12 and 11, respectively, of the battery 10 and are oppositely wound, the net flux produced by the controlling windings 18 and 19 will be proportional to any difference between the voltages of the two cells to which the windings are connected. As is well known in the art, the net flux produced by the controlling windings 18 and 19 of the saturable reactor 15 increases the flux through one of the outer legs of the core 25 carrying one of the controlled windings 31 and decreases the flux through the other outer leg carrying the other controlled winding. The net result is a decrease in the impedance of the controlled windings 31 of the saturable reactor 15 irrespective of the direction of the net flux produced by the controlling windings 18 and 19, this decrease in impedance being proportional to the net flux and thus being proportional to the difference between the voltages of the cells 11 and 12 of the battery 10. The decrease in impedance of the controlled windings 31 of the saturable reactor 15 results in an increase in the current flowing through these windings, such current increase being proportional to the difference between the voltages of the cells 11 and 12 of the battery.

The saturable reactor 16 operates in a similar manner with respect to the cells 12 and 13 of the battery 10. In other words, in the event of a difference between the voltages of the cells 12 and 13, the impedance of the controlled windings 32 of the reactor 16 is reduced to increase the current through the controlled windings 32 an amount proportional to the cell voltage difference. Similarly, a difference between the voltages of the cells 11 and 13 of the battery will produce an increase in the current through the controlled windings 33 of the saturable reactor 17 which is proportional to the difference between the voltages of these cells.

Thus, any difference between the voltages of the cells 11 and 12 of the battery 10 appears as an increase in the current flowing through the controlled windings 31 of the saturable reactor 15, any difference between voltages of the cells 12 and 13 appears as an increase in the current flowing through the controlled windings 32 of the reactor 16, and any difference between the voltages of the cells 11 and 13 appears as an increase in the current flowing through the controlled windings 33 of the reactor 17, the sum of such increases in the current flowing through the controlled windings 31, 32 and 33 being proportional to the difference between the maximum and minimum cell voltages of the battery. In order to demonstrate this, it will be assumed that $e_{max}$ designates the maximum cell voltage, i. e., the voltage of the cell of the battery 10 having the highest voltage, and that $e_{min}$ designates the minimum cell voltage. The intermediate cell voltage will be designated by $e_{int}$. Thus, the current increases in the controlled windings of the saturable reactors 15, 16 and 17 resulting from differences in the voltages of the cells 11, 12 and 13 are proportional to $(e_{max}-e_{min})$, $(e_{max}-e_{int})$ and $(e_{int}-e_{min})$, but not necessarily respectively. Consequently, the sum of the current increases is proportional to $(e_{max}-e_{min})$ since $e_{int}$ cancels out when $(e_{max}-e_{min})$, $(e_{max}-e_{int})$ and $(e_{int}-e_{min})$ are totaled.

Thus, it will be apparent that since the pairs of controlled windings 31, 32 and 33 are connected in parallel, any increase in the current flowing through the arm of the bridge circuit 34 in which the controlled windings are connected is directly proportional to the difference between the maximum and minimum cell voltages of the battery 10, i. e., is directly proportional to $(e_{max}-e_{min})$. Consequently, any differences between the voltages of the cells 11, 12 and 13 of the battery 10 will produce a change in the indication of the voltmeter 41 which bears a direct relation to the difference between the maximum and minimum cell voltages.

The scale of the voltmeter 41 may be so calibrated that the difference between the maximum and minimum cell voltages may be read directly therefrom, or it may be divided into zones marked "Good," "Doubtful," "Bad," or the like, to denote the condition of the battery.

It will thus be apparent that the difference between the maximum and minimum cell voltages of the battery 10 may be determined in a single operation with a single indicator so that an accurate evaluation of the difference results. As an example, if I employ for the voltmeter 41 an instrument having a full scale deflection of 1.0 volt and having an error tolerance of $\pm 5\%$ of the full scale deflection, the maximum meter error would be $\pm 0.05$ volt. If the circuit is so proportioned that a cell voltage difference of 0.15 volt provides a reading of 0.75 volt on the meter 41 and a cell voltage difference of 0.16 volt provides a reading of 0.80 volt, then a meter error of $\pm 0.05$ volt (5% of full scale deflection) would be the equivalent of an error in cell voltage difference of only $\pm 0.01$ volt. It will be understood that even more accurate results may be obtained by employing a voltmeter having a smaller full scale deflection, or by employing a voltmeter having a smaller error tolerance.

An important feature of the present invention resides in the employment of an impedance for the impedance 35 in the second arm of the bridge circuit 34 which increases with an increase in the current flowing through it. As is well known in the art, an iron core reactor has this characteristic when used at a very low flux density. This characteristic can also be obtained at a higher flux density by presaturating the core with a separate field. Accordingly, I prefer to employ for the impedance 35 a saturable reactor having controlled windings 44 which are connected in series in the second arm of the bridge circuit 34, and having a controlling winding 45 which is connected to a constant voltage, direct current source. The controlled windings 44 are oppositely wound on the two outer legs of a three-legged core 46 in the particular construction illustrated, and the controlling winding 45 is wound on the inner leg of the core. The function of the controlling winding 45 is to presaturate the core 46 with the result that the sensitivity of the bridge circuit 34 is greatly increased over that which could be obtained by using a fixed impedance, or an impedance which decreases with an increase in the current flowing therethrough, the latter being the case with reactors which are used at normal values of flux density without presaturation.

In order to prevent damage to the voltmeter 41, I prefer to operate the saturable reactor 35 near the reversal point on its reactance-current curve so that, in the event of high degrees of saturation of the reactors 15, 16 and 17, a decrease in reactance of the reactor 35 occurs due to an increase in the current flowing through the controlled windings 44 thereof above the current value for maximum reactance. This eliminates the high degree of unbalance of the bridge circuit 34 which would otherwise result from high degrees of saturation of the reactors 15, 16 and 17 and thus prevents damage to the voltmeter 41. Excessive saturation of the reactors 15, 16 and 17, may, for example, result from very large differences between the cell voltages of the battery 10, or may result from an open connection to one of the cells, the latter having the effect of producing a cell voltage difference equal to the voltage of one of the cells. Thus, by operating the saturable reactor 35 near the reversal point on its reactance-current curve, I obtain high sensitivity in the normal operating range and low sensitivity outside of the normal operating range.

In Fig. 1 of the drawings, I have shown the controlling winding 45 of the saturable reactor 35 as being connected to the constant voltage source through a variable resistor 47. The resistance of the resistor 47 may be varied to compensate for variations in ambient temperature and the like.

As previously mentioned, evaluating the condition of a battery by the cell-voltage comparison method preferably includes determining the difference between the maximum and minimum cell voltages with no load on the battery, while the battery is being charged, and while the battery is being discharged. Referring to Fig. 1 of the drawings, in order to permit determination of the difference between the maximum and minimum cell voltages while the battery 10 is being charged, it may be connected to a suitable direct current source by leads 50 and 51, the battery being connected to the source through a switch arm 52 which may be moved into engagement with a contact 53 to complete the circuit between the battery and the source of charging current. A resistor 54 is connected to the lead 50 and may be connected in series with the battery 10 by moving the switch arm 52 into engagement with a contact 55 at one end of the resistor to permit testing the battery 10 while it is being discharged. Any desired value of resistance may be employed for the resistor 54, depending upon the rate of discharge desired.

Figure 2:
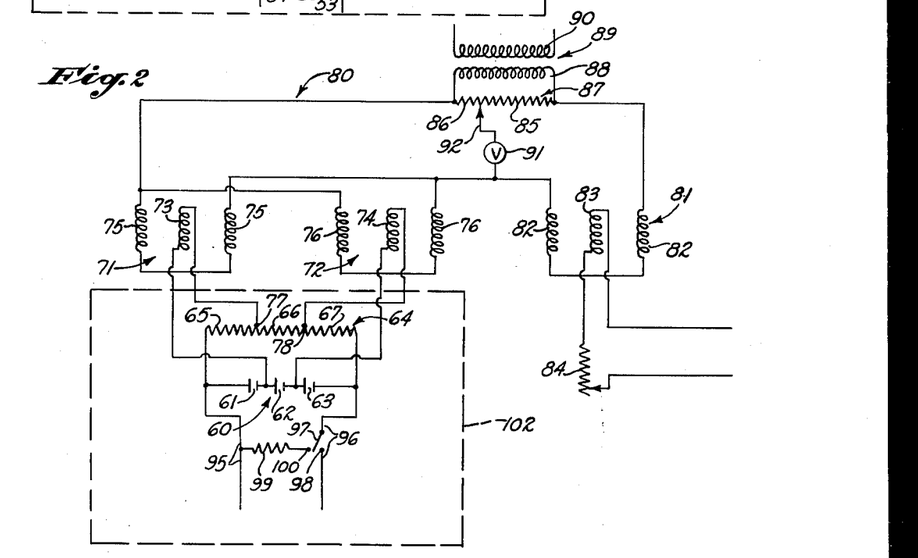
Fig. 2 is a diagrammatic view illustrating a second embodiment of the invention.

In Fig. 2 of the drawings, I show an embodiment of the present invention which differs from that shown in Fig. 1 in that the number of saturable reactors directly associated with the battery being tested is equal to the number of battery cells minus one, rather than being exactly equal to the number of battery cells. In Fig. 2, I show a battery 60, exemplified as a three-cell battery having cells 61, 62 and 63, across which is connected a resistor 64, the latter being divided into as many equal parts as there are cells in the battery. Thus, when a three-cell battery such as the battery 60 is to be tested, the resistor 64 is divided into three equal parts 65, 66 and 67 corresponding to the cells 61, 62 and 63, respectively.

The embodiment shown in Fig. 2 of the drawings includes two saturable reactors 71 and 72 having controlling windings 73 and 74, respectively, and having pairs of controlled windings 75 and 76, respectively. The controlling winding 73 of the saturable reactor 71 is connected to the dividing point 77 between the parts 65 and 66 of the resistor 64, and is connected to the junction between the cells 61 and 62 of the battery 60. Similarly, the controlling winding 74 of the saturable reactor 72 is connected to the dividing point 78 between the parts 66 and 67 of the resistor 64 and is connected to the junction between the cells 62 and 63 of the battery.

The controlled windings 75 of the saturable reactor 71 are oppositely wound and are connected in series with each other, the same being true of the controlled windings 76 of the reactor 72. The pairs of controlled windings 75 and 76 of the saturable reactors 71 and 72 are connected in parallel in one arm of a bridge circuit 80 having in its second arm a third saturable reactor 81 which serves the same purpose as the saturable reactor 35 in the embodiment illustrated in Fig. 1 of the drawings, the reactor 81 including controlled windings 82 connected in series, and including a controlling winding 83 which is connected to a constant voltage, direct current source through a variable resistor 84. The third and fourth arms of the bridge circuit 80 are formed by two parts 85 and 86 of a resistor 87, a secondary winding 88 of a transformer 89 having a primary winding 90 connected to an alternating current source being connected across the resistor 87. A suitable indicating device, exemplified as a voltmeter 91, is connected across one diagonal of the bridge circuit 80, one terminal of the voltmeter being connected to the junction between the first and second arms of the bridge and the other terminal thereof being connected through a movable contact 92 to the junction between the third and fourth arms of the bridge. The purpose of the movable contact 92 is to permit varying the relative resistances of the third and fourth arms of the bridge circuit 80 to permit balancing the circuit and, if desired, this construction may be incorporated in the embodiment illustrated in Fig. 1 of the drawings.

In order to permit testing the battery 60 while it is being charged, I provide leads 95 and 96 for connecting the battery to a suitable source of direct current, a switch arm 97 interposed between the battery and the direct current source being movable into engagement with a contact 98 to complete the circuit between the battery and the source of charging current. In order to permit testing the battery 60 while it is being discharged, I provide a resistor 99 which is connected to the lead 95 and which may be connected across the battery 60 by moving the switch arm 97 into engagement with a contact 100 thereon. Thus, with the switch arm 97 in the position shown in Fig. 2, the battery 60 may be tested under no load, or may be tested while being charged or discharged by moving the switch arm 97 into engagement with the contact 98 or the contact 100, respectively.

Considering the operation of the embodiment of my invention which is illustrated in Fig. 2 of the drawings, it will be apparent that if the voltages of the cells 61, 62 and 63 of the battery 60 are equal, the dividing points 77 and 78 between the parts of the resistor 64 and the junctions between the cells of the battery will all be at the same potential so that no current will flow through the controlling windings 73 and 74 of the saturable reactors 71 and 72. However, if the voltage of one of the cells of the battery 60 deviates from $1/n$ of the total battery voltage, where $n$ represents the number of cells (in this case 3), current will flow in at least one of the controlling windings 73 or 74 of the saturable reactors 71 or 72, thereby decreasing the impedance of the corresponding controlled windings 75 or 76 and permitting an increase in the current flowing therethrough. The total increase in current through the controlled windings 75 and 76 is a function of the difference between the maximum and minimum voltages of the cells of the battery 60, and, since the pairs of controlled windings 75 and 76 are connected in parallel, the voltmeter 91 will respond to the difference between the maximum and minimum cell voltages. As previously indicated in connection with the embodiment illustrated in Fig. 1, the scale of the voltmeter 91 may be so calibrated that the difference between the maximum and minimum cell voltages may be read directly therefrom, or may be divided into zones, etc.

Figure 3:
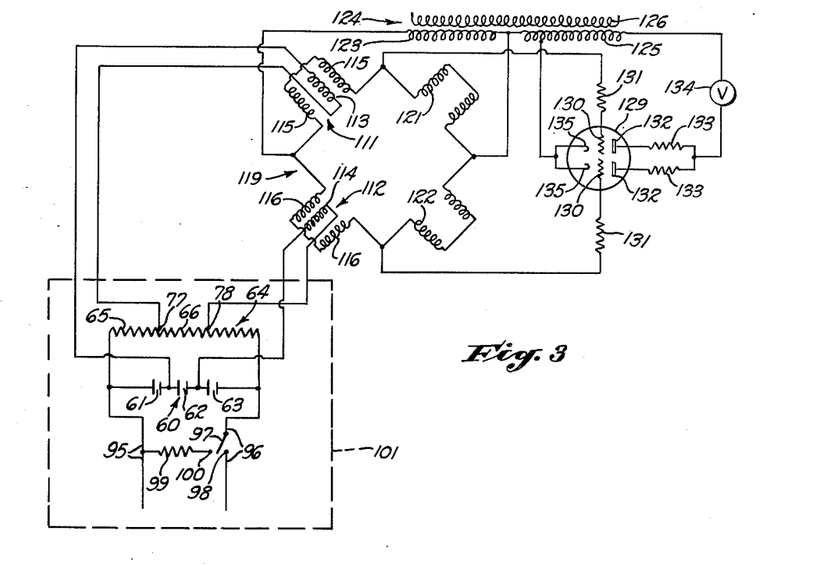
Fig. 3 is a diagrammatic view illustrating a third embodiment of the invention.

In Fig. 3 of the drawings, I show an embodiment of my invention which, in part, is identical to that shown in Fig. 2, that portion of the circuit shown in Fig. 3 which lies within the broken lines 101 being identical to that portion of the circuit of Fig. 2 which lies within the broken lines 102. The components of the embodiment illustrated in Fig. 3 which lie within the broken lines 101 are identified by the numerals used to identify the corresponding components of the embodiment illustrated in Fig. 2 which lie within the broken lines 102.

The apparatus illustrated in Fig. 3 of the drawings includes a pair of saturable reactors 111 and 112 having controlling windings 113 and 114, respectively, the winding 113 being connected to the dividing point 77 between the parts 65 and 66 of the resistor 64 and to the junction between the cells 61 and 62 of the battery 60, and the winding 114 being connected to the dividing point 78 between the parts 66 and 67 of this resistor and to the junction between the cells 62 and 63 of the battery. Each of the saturable reactors 111 and 112 includes two controlled windings which are oppositely wound and connected in series, the controlled windings of the saturable reactor 111 being identified by the numerals 115 and those of the saturable reactor 112 being identified by the numerals 116. The pairs of controlled windings 115 and 116 form two arms of a bridge circuit 119 the other two arms of which are formed by impedances 121 and 122. Preferably, the impedances 121 and 122 are formed by the controlled windings of saturable reactors (the cores of which are not shown) which serve the same purpose as the saturable reactors 35 and 81 of the embodiment shown in Figs. 1 and 2 of the drawings, respectively.

Connected across one diagonal of the bridge circuit 119 is a secondary winding 123 of a transformer 124, the latter having another secondary winding 125 and a primary winding 126. The grids of a duo-triode tube 129 are connected across the other diagonal of the bridge circuit, this tube having two grids 130, one of which is connected through a resistor 131 to the junction between the controlled windings 115 and the impedance 121, and the other of which is connected through another resistor 131 to the junction between the controlled windings 116 and the impedance 122. The tube 129 is provided with two plates 132 which are connected through load resistors 133 to one terminal of an indicating device, exemplified as a voltmeter 134. The other terminal of the voltmeter is connected to one end of the secondary winding 125, the other end of the secondary winding being connected to the junction between the impedances 121 and 122 of the bridge circuit 119. The tube 129 is provided with cathodes 135 which are connected to an intermediate point on the secondary winding 125 of the transformer 124. Although the plates 132 are shown as connected to an alternating current source, they may be connected to a direct current source if desired.

It will be apparent that the tube 129 serves to amplify the effect of reductions in the impedances of the controlled windings 115 and 116 of the saturable reactors 111 and 112 due to differences between the voltages of the cells 61, 62 and 63 of the battery 60 so as to increase the deflection of the voltmeter 134 for a given difference between the maximum and minimum cell voltages thereby increasing the sensitivity of the apparatus. Although I have shown in Fig. 3 of the drawings a modification of the embodiment shown in Fig. 2, it will be understood that the embodiment illustrated in Fig. 1 may be modified in a similar manner if greater sensitivity is desired.

Figure 4:
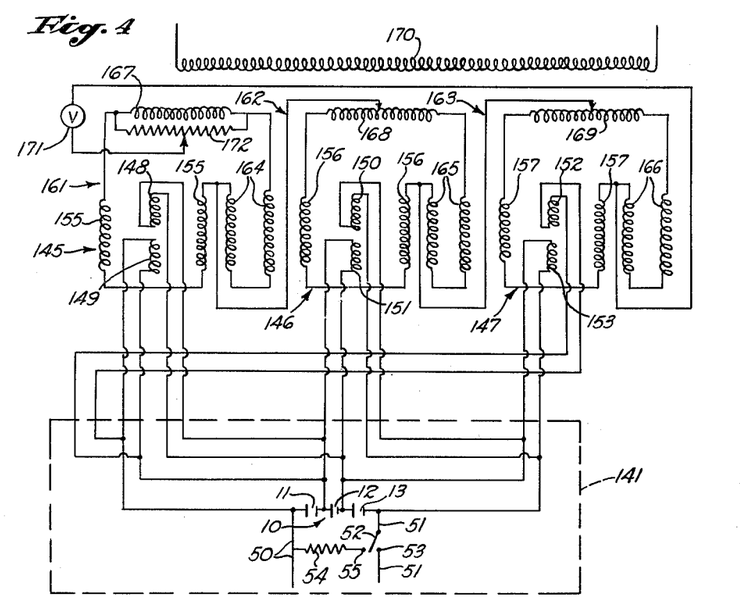
Fig. 4 is a diagrammatic view illustrating a fourth embodiment of the invention.

The embodiment of my invention which is illustrated in Fig. 4 of the drawings, is, in part, identical to that illustrated in Fig. 1, that portion of the circuit shown in Fig. 4 which lies within the broken lines 141 being identical to that portion of the circuit of Fig. 1 which lies within the broken lines 142. Those components of the embodiment illustrated in Fig. 4 which lie within the broken lines 141 are identified by the numerals used to identify the corresponding components of the embodiment illustrated in Fig. 1 which lie within the broken lines 142.

The apparatus illustrated in Fig. 4 of the drawings includes three saturable reactors 145, 146 and 147 which correspond to the saturable reactors 15, 16 and 17, respectively, of the embodiment illustrated in Fig. 1. The saturable reactor 145 is provided with controlling windings 148 and 149 which correspond to the controlling windings 18 and 19 of the saturable reactor 15 and which are connected to the battery 10 in the same manner, the saturable reactor 146 is provided with controlling windings 150 and 151 which correspond to the controlling windings 20 and 21 of the saturable reactor 16 and which are connected to the battery 10 in the same manner, and the saturable reactor 147 is provided with controlling windings 152 and 153 which correspond to the controlling windings 22 and 23 of the saturable reactor 17 and which are also connected to the battery in the same manner. The reactors 145, 146 and 147 are respectively provided with pairs of controlled windings 155, 156 and 157 which correspond to the controlled windings 31, 32, and 33 of the reactors 15, 16 and 17.

Instead of being connected in parallel in one arm of a bridge circuit as in the embodiment illustrated in Fig. 1 of the drawings, the pairs of controlled windings 155, 156 and 157 of the reactors 145, 146 and 147 are connected in separate bridge circuits 161, 162 and 163, respectively, each pair of controlled windings 155, 156 and 157 forming one arm of the corresponding bridge circuit. Adjacent arms of the bridge circuits 161, 162 and 163 comprise impedances 164, 165 and 166, respectively. Preferably, the impedances 164, 165 and 166 are formed by the controlled windings of saturable reactors (the controlled windings of which are not shown) which perform functions similar to that performed by the saturable reactor 35 of the embodiment illustrated in Fig. 1 of the drawings. The third and fourth arms of the bridge circuits 161, 162 and 163 are formed by secondary windings 167, 168 and 169, respectively, of a transformer, such secondary windings being inductively coupled with a primary winding 170 which may be connected to a suitable alternating current source.

The bridge circuits 161, 162 and 163 are connected in series in the manner illustrated in Fig. 4 of the drawings to form a closed circuit, a voltmeter 171 being connected in the circuit. Preferably, a potentiometer 172 is connected in series with the voltmeter 171 and bridge circuits 161, 162 and 163 for balancing purposes. It will be apparent that if any differences between the cell voltages of the battery 10 obtain, the impedances of the controlled windings 155, 156 and 157 of the saturable reactors 145, 146 and 147 will be decreased, as previously discussed, thus producing a deflection of the voltmeter 171. As before, such deflection of the voltmeter is a function of the maximum cell voltage difference.

Figure 5:
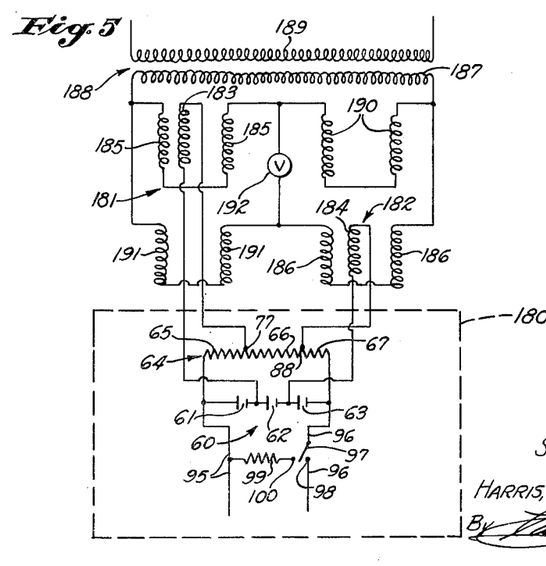
Fig. 5 is a diagrammatic view illustrating a fifth embodiment of the invention.

In Fig. 5 of the drawings, I show an embodiment of my invention which, in part, is identical to that shown in Fig. 2, that portion of the circuit shown in Fig. 5 which lies within the broken lines 180 being identical to that portion of the circuit of Fig. 2 which lies within the broken lines 102. The components of the embodiment illustrated in Fig. 5 which lie within the broken lines 180 are identified by the numerals used to identify the corresponding components of the embodiment illustrated in Fig. 2 which lie within the broken lines 102.

The apparatus illustrated in Fig. 5 of the drawings includes a pair of saturable reactors 181 and 182 having controlling windings 183 and 184 which correspond to the controlling windings 73 and 74, respectively, of the saturable reactors 71 and 72 of the embodiment illustrated in Fig. 2 of the drawings, the controlling windings 183 and 184 being connected to the battery 60 in the same manner as the controlling windings 73 and 74. The saturable reactors 181 and 182 are also provided with pairs of controlled windings 185 and 186, respectively.

Instead of connecting the controlled windings 185 and 186 of the saturable reactors 181 and 182 in parallel through a common impedance as is the case with the controlled windings 73 and 74 of the saturable reactors 71 and 72 of the embodiment illustrated in Fig. 2 of the drawings, I connect the controlled windings 185 and 186 across an alternating current source, exemplified as a secondary winding 187 of a transformer 188 which includes a primary winding 189, through separate impedances 190 and 191, respectively. It will be noted that the controlled windings 185 and 186 of the saturable reactors 181 and 182 are connected to opposite sides of the alternating current source. Preferably, the impedances 190 and 191 are formed by the controlled windings of saturable reactors which perform functions similar to that of the controlled windings 82 of the saturable reactor 81 of the embodiment illustrated in Fig. 2 of the drawings.

A voltmeter 192 is connected between the junction of the controlled windings 185 and the impedance 190 and the junction of the controlled windings 186 and the impedance 191, the voltmeter thus being connected across one diagonal of a bridge circuit formed by the controlled windings 185 and 186 and the impedances 190 and 191. It will be apparent that if differences in the cell voltages of the battery 60 obtain, such differences will produce a deflection of the voltmeter 192, the voltmeter deflection, as in the previously discussed embodiments, bearing a direct relation to the maximum cell voltage difference.

Although I have described the operation of the foregoing embodiments of my invention as used to obtain actual measurements of the differences between the maximum and minimum cell voltages with the voltmeters 41, 91, 134, 171 and 192, these embodiments may be used to control the operation of other apparatus in response to a difference between the maximum and minimum values of various electric quantities, e. g., the difference between the maximum and minimum cell voltages of a battery. In the embodiment illustrated in Fig. 1 of the drawings, for example, the reduction in impedance of the controlled windings 31, 32 and 33 of the saturable reactors 15, 16 and 17 resulting from differences in the voltages of the cells 11, 12 and 13 of the battery 10 may be utilized to actuate a warning or control device (not shown) instead of the voltmeter 41, such a warning or control device being substituted for the voltmeter in the bridge circuit 34 and providing either a visible or an audible signal or a control potential when the difference between the maximum and minimum cell voltages reaches a predetermined value. Similarly, devices of various other types may be substituted for the voltmeter 41 in the embodiment illustrated in Fig. 1 of the drawings, or for the voltmeters in the embodiments illustrated in Figs. 2 to 5.

As hereinbefore discussed, one of the features of the present invention resides in the provision of a method of compensating for variations in the specific gravity of the electrolyte from one cell to another when the condition of the battery is being determined by the cell voltage comparison method. As will be apparent to those skilled in the art, if the specific gravity of the electrolyte in one cell of a battery differs from that in another cell, a difference between the voltages of such cells may exist even if the battery is otherwise in good condition. For example, such a difference between the specific gravities of the electrolyte in the two cells would result if, through careless servicing or otherwise, acid is removed from one of the cells and placed into the other. Although it is necessary to transfer a large amount of acid from one cell to another to cause a difference of, for example, 0.10 volt or more between the voltages of the two cells in a fully charged battery, I prefer to compensate for specific gravity differences in order to permit accurate evaluation of any difference between the maximum and minimum cell voltages due to factors other than specific gravity inequalities.

Figure 6:
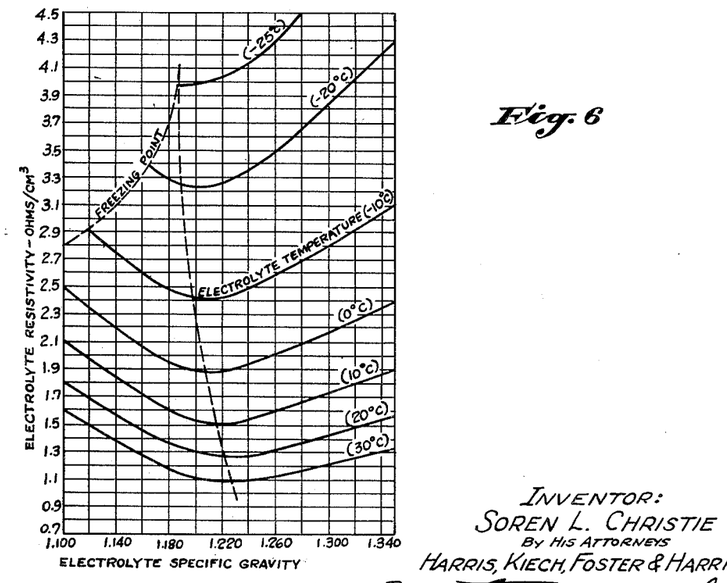
Fig. 6 is a diagrammatic view illustrating a chart for use in connection with the method of the invention.

I have found that the desired result may be attained by determining the difference between the maximum and minimum cell voltages when the specific gravity of the electrolyte is at a value such that its resistivity is a minimum. Referring to Fig. 6 of the drawings, I show, for purposes of illustration, a graph which indicates the variations of the resistivity of sulphuric acid with specific gravity for different temperatures, the resistivity versus specific gravity curve for each temperature having a point thereon where the resistivity is a minimum. It will be apparent that at the point where the gradient of each specific gravity versus resistivity curve is zero, i. e., at the point on each specific gravity versus resistivity curve where the value of the specific gravity of the electrolyte is such that its resistivity is a minimum, relatively large variations in specific gravity of the electrolyte will not change the resistivity thereof appreciably. For example, considering the lowermost curve in the graph in Fig. 6, i. e., the curve for an electrolyte temperature of 30° C., it will be seen that the specific gravity may be varied throughout the range of from 1.200 to 1.250, for example, without changing the resistivity appreciably.

In view of the foregoing, it will be apparent that by testing a battery by the cell voltage comparison method when the specific gravity of the electrolyte is in the vicinity of the point of zero gradient on the specific gravity versus resistivity curve for a given temperature, even relatively large differences in specific gravity from one cell to another will produce only minor differences between the resistances of the two cells and thus will produce only slight differences between the voltages of the two cells while the battery is being charged or discharged. Thus, by determining the difference between the maximum and minimum cell voltages of a battery in the manner hereinbefore described when the specific gravity of the electrolyte in the battery is at a value such that its resistivity is a minimum, correct results will be obtained even though relatively large differences between the specific gravities of the electrolyte in the various cells may obtain. Thus, I provide a method of compensating for specific gravity differences, which is an important feature of the present invention.

Although I have disclosed various embodiments of the apparatus of my invention herein for purposes of illustration, various changes, modifications and substitutions may be incorporated therein without necessarily departing from the spirit of the invention and I hereby reserve the right to all such changes, modifications and substitutions as properly come within the scope of the invention as set forth in the appended claims.

I claim as my invention:

1. In an apparatus which is responsive to the condition of a battery having at least three cells and which includes a single instrumentality responsive to the maximum difference between the voltages of the battery cells, the combination of: electric circuit means connectible to the battery cells for producing at least two electric quantities respectively variable with variations in any voltage differences between the battery cells; and means connecting said electric circuit means and said instrumentality for combining said electric quantities into a single value applied to said instrumentality and proportional to the maximum difference between the voltages of the battery cells.

2. In an apparatus for testing a battery having at least three cells with a single meter responsive to the maximum difference between the voltages of the battery cells, the combination of: means including at least two saturable reactors each having a controlling winding means connectible to the battery cells and a controlled winding means magnetically coupled with said controlling winding means for producing in said controlled windings electric variations respectively representative of any voltage differences between the battery cells; and means connected to all of said controlled winding means and to said meter for combining said electric variations into a single value applied to said meter and proportional to the maximum difference of the voltages of the battery cells.

3. In an apparatus for determining the maximum difference between the voltages of the cells of a battery having at least three cells, the combination of: controlling circuit means connectible to the battery cells for producing at least two controlling electric quantities respectively representative of differences between the voltages of the battery cells; controlled circuit means coupled with said controlling circuit means for producing at least two controlled electric quantities respectively determined by said controlling electric quantities; and means connected to said controlled circuit means for combining said controlled electric quantities into a single electric value representative of any difference between the maximum and minimum cell voltages.

4. In an apparatus for determining the maximum difference between the cell voltages of a battery having at least three cells, the combination of: flux generating means connectible to the battery cells for producing at least two magnetic fluxes respectively determined by differences between the voltages of the battery cells; flux responsive means connected to said flux generating means for producing at least two electric variations respectively determined by said magnetic fluxes; and means electrically connected to said flux responsive means for translating said electric variations into a single electric quantity determined by a difference between the maximum and minimum cell voltages.

5. In an apparatus of the character described which is responsive to the maximum difference between the cell voltages of a battery having at least three cells, the combination of: a number of controlling winding means at least equal to the number of battery cells minus one; a number of controlled winding means equal to the number of controlling winding means, said controlled winding means being magnetically coupled with said controlling winding means, respectively; controlling circuit means electrically connected to all of said controlling winding means and electrically connectible to the battery cells for delivering to said controlling winding means electric currents respectively representative of differences between the voltages of the battery cells, thereby inducing in said controlled winding means electric quantities respectively determined by said electric currents; an instrumentality responsive to a single electric value representative of the maximum difference between the voltages of the battery cells; and controlled circuit means electrically connected to all of said controlled winding means and to said instrumentality for translating said electric variations into said single electric value.

6. An apparatus as set forth in claim 5 wherein each of said controlling winding means and the controlled winding means coupled therewith form parts of a saturable reactor.

7. A method of determining the condition of a battery having at least three cells with a single meter responsive to any difference between the maximum and minimum cell voltages, including the steps of: producing a plurality of electric values respectively proportional to differences between the voltages of the battery cells; combining said electric values into a single electric quantity determined by the maximum difference between the cell voltages; and applying said single electric quantity to the meter.

8. A method of determining the condition of a battery having at least three cells with a single instrumentality responsive to any difference between the maximum and minimum cell voltages, including the steps of: producing at least two electric currents respectively proportional to differences between the voltages of the battery cells; producing electric variations respectively representative of said electric currents; combining said electric variations into a single electric value determined by the maximum difference between the voltage of the battery cells; and applying said single electric value to said instrumentality.

9. In an apparatus responsive to any difference between the maximum and minimum cell voltages of a battery having at least three series-connected cells, the combination of: a number of series-connected resistors equal to the number of battery cells; means for connecting said series-connected resistors in series with the battery; a number of controlling winding means equal to the number of resistors and battery cells minus one; means for connecting one side of one of said controlling winding means between a pair of the battery cells and for connecting the other side thereof between a pair of said resistors; means for connecting one side of another of said controlling winding means between another pair of the battery cells and for connecting the other side thereof between another pair of said resistors; a number of controlled winding means equal to the number of controlling winding means, said controlled winding means being magnetically coupled with said controlling winding means, respectively, whereby any electric currents flowing through said controlling winding means due to differences between the voltages of the battery cells produce in said controlled winding means electric quantities respectively determined by said electric currents; and electric circuit means connected to all of said controlled winding means for combining said electric quantities into a single electric value determined by any difference between the maximum and minimum battery cell voltages.

10. An apparatus as set forth in claim 9 wherein said electric circuit means comprises a bridge circuit having said controlled winding means therein, said apparatus additionally including an instrumentality responsive to said single electric value connected across said bridge circuit.

11. An apparatus as set forth in claim 10 wherein said controlled winding means are connected in parallel in one arm of said bridge circuit.

12. In an apparatus responsive to any difference between the maximum and minimum cell voltages of a battery having at least three series-connected cells, the combination of: a number of controlling winding means equal to the number of battery cells, each of said controlling winding means including a pair of opposed controlling windings; means for respectively connecting said controlling windings of one of said controlling winding means across the battery cells of one pair of such cells; means for respectively connecting said controlling windings of another of said controlling winding means across the battery cells of another pair of such cells; means for respectively connecting said controlling windings of still another of said controlling winding means across the battery cells of still another pair of such cells; a number of controlled winding means equal to the number of controlling winding means, said controlled winding means being magnetically coupled with said controlling winding means, respectively, whereby any electric currents in said controlling winding means due to differences between the voltages of the battery cells induce in said controlled winding means impedance variations respectively determined by said electric currents; and electric circuit means connected to all of said controlled winding means for combining said impedance variations into a single electric value determined by the maximum difference between the voltages of the battery cells.

13. An apparatus as set forth in claim 12 wherein said electric circuit means comprises a bridge circuit means having said controlled winding means therein, said apparatus additionally including an instrumentality responsive to said single electric value connected across said bridge circuit means.

14. An apparatus as set forth in claim 13 wherein said controlled winding means are connected in parallel in one arm of said bridge circuit means.

15. In an apparatus for testing a battery having at least three cells with a single meter responsive to the maximum difference between the voltages of the battery cells, the combination of: a number of saturable reactors at least equal to the number of battery cells minus one, each of said saturable reactors having a controlling winding means and a controlled winding means magnetically coupled therewith; electrical circuit means connected to all of said controlling winding means and connectible to the battery cells for producing in said controlling winding means controlling electric quantities representative of voltage differences between the battery cells, whereby to establish in said controlled winding means controlled electric quantities respectively determined by said controlling electric quantities; and electrical circuit means connected to all of said controlled winding means and to said meter for combining said controlled electric quantities into a single electric variable applied to said meter and representative of the maximum difference between the voltages of the battery cells.

16. An apparatus according to claim 15 wherein the electrical circuit means last defined includes a bridge circuit, and wherein all of said controlled winding means are connected in parallel in one arm of said bridge circuit, said meter being connected across said bridge circuit.

17. An apparatus according to claim 15 wherein the electrical circuit means last defined includes a bridge circuit, and wherein said controlled winding means are disposed in different arms of said bridge circuit, said meter being connected across said bridge circuit.

18. An apparatus according to claim 15 wherein the electrical circuit means last defined includes a number of bridge circuits equal to the number of said saturable reactors, each of said controlled winding means being disposed in one arm of one of said bridge circuits, and said bridge circuits being connected in series with said meter connected across all of said bridge circuits.

19. An apparatus according to claim 15 wherein the electrical circuit means last defined includes a bridge circuit means in which said controlled winding means are connected, said apparatus further including another saturable reactor in said bridge circuit means, and further including means for presaturating the core of said other saturable reactor.

20. In an apparatus for determining the maximum difference between the values of electric characteristics of a plurality of electrical elements, the combination of: a number of controlling winding means at least equal to the number of said electrical elements minus one; electrical circuit means, including electrical conductors connected to said controlling winding means and connectible to said electrical elements, for connecting said controlling winding means to different ones of said electrical elements so as to

17 establish in said controlling winding means controlling electric quantities representative of differences between the valves of said electric characteristics; a number of controlled winding means equal to the number of controlling winding means, said controlling winding means being coupled with said controlled winding means, respectively, so as to establish in said controlled winding means controlled electric quantities respectively determined by said controlling electric quantities; a meter responsive to the maximum difference between the values of said electric characteristics; and electrical circuit means connected to all of said controlled winding means and to said meter for combining said controlled electric quantities into a single electric variable applied to said meter and representative of the maximum difference between the values of said electric characteristics.

21. An apparatus according to claim 20 wherein the number of controlling winding means is equal to the number of said electrical elements minus one, wherein said electrical elements are connected in series, and wherein the first electrical circuit means defined in claim 20 includes: a number of series-connected resistors equal to the number of said electrical elements; electrical conductors for connecting said series-connected resistors in series with said series-connected electrical elements; and conductors for connecting one side of each of said controlling winding means between a pair of said electrical elements and for connecting the other side thereof between a pair of said resistors.

18

22. An apparatus as defined in claim 20 wherein the number of controlling winding means is equal to the number of said electrical elements, wherein each of said controlling winding means includes a pair of controlling windings, and wherein the first electrical circuit means defined in claim 20 includes conductors for connecting said controlling windings across said electrical elements, the controlling windings of each controlling winding means being connected across different electrical elements.

SOREN L. CHRISTIE.

REFERENCES CITED

The following references are of record in the file of this patent:

UNITED STATES PATENTS

| Number | Name | Date |
|---|---|---|
| 1,524,285 | Besag | Jan. 27, 1925 |
| 1,565,504 | Rudd et al. | Dec. 15, 1925 |
| 1,776,130 | Petch | Sept. 16, 1930 |
| 1,981,921 | Logan | Nov. 27, 1934 |
| 2,066,919 | West | Jan. 5, 1937 |
| 2,082,607 | Amsden | June 1, 1937 |
| 2,101,571 | Breisch | Dec. 7, 1937 |
| 2,149,092 | Kettler | Dec. 28, 1939 |
| 2,229,952 | Whiteley et al. | Jan. 28, 1941 |
| 2,388,070 | Middel | Oct. 30, 1945 |
| 2,444,726 | Bussey | July 6, 1948 |
| 2,518,865 | Cartotto | Aug. 15, 1950 |